United States Patent
Kosaka et al.

(10) Patent No.: US 9,014,950 B2
(45) Date of Patent: Apr. 21, 2015

(54) CONTROL SYSTEM FOR INTERNAL COMBUSTION ENGINE

(75) Inventors: Yosuke Kosaka, Wako (JP); Daisuke Shiomi, Wako (JP); Jiro Takagi, Wako (JP); Masaya Agata, Wako (JP); Kentaro Onuma, Wako (JP); Shinobu Ochiai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 966 days.

(21) Appl. No.: 13/172,489

(22) Filed: Jun. 29, 2011

(65) Prior Publication Data
US 2012/0053822 A1 Mar. 1, 2012

(30) Foreign Application Priority Data
Aug. 27, 2010 (JP) ................................. 2010-191479

(51) Int. Cl.
*F02P 5/15* (2006.01)
*F02P 5/152* (2006.01)
(Continued)

(52) U.S. Cl.
CPC .......... *F02D 11/105* (2013.01); *F02D 13/0238* (2013.01); *F02D 41/0002* (2013.01); *F02D 41/0062* (2013.01); *F02D 41/0072* (2013.01); *F02D 41/18* (2013.01); *F02D 2041/001* (2013.01); *F02D 2200/0402* (2013.01); *F02D 2200/0408* (2013.01);
(Continued)

(58) Field of Classification Search
CPC ......... Y02T 10/18; Y02T 10/46; Y02T 10/42; Y02T 10/47; F02D 41/001; F02D 41/0002; F02D 41/0062; F02D 41/18; F02D 41/0072; F02D 2200/0405; F02D 2200/0408; F02D 2200/1002; F02D 2200/1004; F02D 2200/703; F02D 2200/0402

USPC ........... 123/435, 436, 406.23, 406.36, 568.21
See application file for complete search history.

(56) References Cited

U.S. PATENT DOCUMENTS 4,279,235 A * 7/1981 Flaig et al. ............... 123/568.21
5,205,260 A * 4/1993 Takahashi et al. ............ 123/494
(Continued)

FOREIGN PATENT DOCUMENTS

DE 101 40 970 A1 3/2002
DE 102 14 722 A1 11/2002
(Continued)

*Primary Examiner* — Hieu T Vo
*Assistant Examiner* — Arnold Castro
(74) *Attorney, Agent, or Firm* — Westerman, Hattori, Daniels & Adrian, LLP

(57) ABSTRACT

A control system for an internal combustion engine having a throttle valve disposed in an intake passage of the engine. A target intake air amount of the engine is calculated, and an intake pressure of the engine is estimated. A wide-open intake air amount is calculated according to the engine rotational speed, and a theoretical intake air amount is calculated according to the wide-open intake air amount and the intake pressure. The wide-open intake air amount is an intake air amount corresponding to a state where the throttle valve is fully opened, and the theoretical intake air amount is an intake air amount corresponding to a state where no exhaust gas of the engine is recirculated to a combustion chamber of the engine. further, an exhaust gas recirculation ratio is calculated using the theoretical intake air amount and the target intake air amount, and a target output torque of the engine is calculated using the target intake air amount and the exhaust gas recirculation ratio. The engine is controlled using the target output torque.

4 Claims, 11 Drawing Sheets

(51) Int. Cl.
  *F02D 11/10* (2006.01)
  *F02D 41/18* (2006.01)
  *F02D 41/00* (2006.01)
  *F02D 13/02* (2006.01)

(52) U.S. Cl.
  CPC .......... *F02D 2200/1002* (2013.01); *F02D 2200/1004* (2013.01); *F02D 2200/703* (2013.01); *F02D 2250/18* (2013.01); *F02P 5/1504* (2013.01); *F02P 5/1516* (2013.01); *F02P 5/152* (2013.01); *Y02T 10/46* (2013.01); *Y02T 10/42* (2013.01); *Y02T 10/47* (2013.01); *Y02T 10/18* (2013.01)

(56) References Cited

U.S. PATENT DOCUMENTS

| | | | |
|---|---|---|---|
| 5,611,309 A * | 3/1997 | Kumagai et al. | 123/399 |
| 6,079,387 A * | 6/2000 | Mamiya et al. | 123/399 |
| 6,227,182 B1 * | 5/2001 | Muraki et al. | 123/568.21 |
| 6,298,835 B1 * | 10/2001 | Horie et al. | 123/568.21 |
| 6,367,462 B1 | 4/2002 | McKay et al. | |
| 6,397,814 B1 * | 6/2002 | Nagaishi et al. | 123/348 |
| 6,502,546 B2 * | 1/2003 | Kawasaki et al. | 123/399 |
| 2003/0079721 A1 | 5/2003 | Kolmanovsky et al. | |
| 2004/0236493 A1 | 11/2004 | Sisken et al. | |
| 2007/0039598 A1 * | 2/2007 | Wakayama et al. | 123/568.21 |
| 2007/0056560 A1 * | 3/2007 | Trask et al. | 123/399 |

FOREIGN PATENT DOCUMENTS

| | | |
|---|---|---|
| EP | 0 893 590 A2 | 1/1999 |
| EP | 2 211 043 A1 | 7/2010 |
| JP | 2003-269306 A | 9/2003 |
| JP | 2006-29194 A | 2/2006 |

* cited by examiner

CONTROL SYSTEM FOR INTERNAL COMBUSTION ENGINE

BACKGROUND OF THE INVENTION

1. Field of the Invention

The present invention relates to a control system for an internal combustion engine, and particularly to a control system in which an engine operating parameter (torque related parameter) related to the engine output torque is calculated according to the exhaust gas recirculation ratio, and the engine is controlled using the calculated torque related parameter.

2. Description of the Related Art

In the control system for an internal combustion engine, the torque demand control (torque base control) is used in recent years, as shown in Japanese patent laid-open No. 2006-29194 (JP-'194). In the torque demand control, a target torque of the engine is calculated according to a vehicle control demand torque which is necessary for the transmission control or the traction control, as well as the driver's demand torque. Further, an actual output torque of the engine is estimated or detected, and the intake air amount (fuel supply amount) and/or the ignition timing of the engine are controlled so that the actual output torque coincides with the target torque.

Japanese patent laid-open No. 2003-269306 (JP-'306) discloses a control system for an internal combustion engine, wherein a residual gas ratio (an internal exhaust gas recirculation ratio), which is a residual ratio of burned gases remaining in the combustion chamber after combustion, is calculated, and the ignition timing is controlled according to the residual gas ratio. According to this control system, the residual gas ratio is calculated based on the engine rotational speed, the valve overlap amount (an overlapped period of the valve opening periods corresponding to the intake valve and the exhaust valve), the intake pressure, the exhaust gas temperature, and the intake air amount.

Further, a known control system for an internal combustion engine having an exhaust gas recirculation mechanism, uses a method for calculating an exhaust gas recirculation ratio using a map for calculating the exhaust gas recirculation ratio (the external exhaust gas recirculation ratio) set according to an opening of the exhaust gas recirculation control valve.

In the torque base control, it is necessary to estimate the actual output torque based on the engine operating parameter. In the system shown in JP-'194, the actual output torque is calculated by retrieving tables or maps according to the intake air amount, the engine rotational speed, the air-fuel ratio, the ignition timing, and a parameter indicative of the intake valve operating condition. Accordingly, the man power necessary for setting the tables or maps is comparatively large.

Regarding the calculation method of the residual gas ratio shown in JP-'306, the number of parameters applied to the calculation is comparatively large. Accordingly, there is a similar problem that the man power necessary for setting the tables or maps becomes large. Further, in the conventional method for calculating the external exhaust gas recirculation ratio, many maps are necessary corresponding to various operating conditions.

Therefore, more tables or maps are necessary for performing the torque demand control taking the exhaust gas recirculation ratio into account, wherein the exhaust gas recirculation ratio is calculated according to both of the internal exhaust gas recirculation amount and the external exhaust gas recirculation amount, which requires much more man power for setting tables or maps.

SUMMARY OF THE INVENTION

The present invention is made contemplating the above-described point, and an objective of the invention is to provide a control system for an internal combustion engine, which can accurately calculate the torque related parameter which is necessary in the torque demand control according to the exhaust gas recirculation ratio by a comparatively simple method.

To attain the above objective, the present invention provides a control system for an internal combustion engine having a throttle valve (3) disposed in an intake passage (2) of the engine. The control system includes rotational speed detecting means, target intake air amount calculating means, intake pressure estimating means, wide-open intake air amount calculating means, theoretical intake air amount calculating means, exhaust gas recirculation ratio calculating means, target output torque calculating means, and control means. The rotational speed detecting means detects a rotational speed (NE) of the engine, and the target intake air amount calculating means calculates a target intake air amount (GADRV) of the engine. The intake pressure estimating means estimates an intake pressure (HPBA) of the engine. The wide-open intake air amount calculating means calculates a wide-open intake air amount (GAWOT) according to the engine rotational speed (NE). The wide-open intake air amount (GAWOT) is an intake air amount corresponding to a state where the throttle valve is fully opened. The theoretical intake air amount calculating means calculates a theoretical intake air amount (GATH) according to the wide-open intake air amount (GAWOT) and the intake pressure (HPBA). The theoretical intake air amount (GATH) is an intake air amount corresponding to a state where no exhaust gas of the engine is recirculated to a combustion chamber of the engine. The exhaust gas recirculation ratio calculating means calculates an exhaust gas recirculation ratio (REGRT) using the theoretical intake air amount (GATH) and the target intake air amount (GADRV). The target output torque calculating means calculates a target output torque (TRQDRV) of the engine using the target intake air amount (GADRV) and the exhaust gas recirculation ratio (REGRT). The control means controls the engine using the target output torque (TRQDRV).

With this configuration, the target intake air amount of the engine is calculated; the wide-open intake air amount, which is an intake air amount corresponding to the state where the throttle valve is fully opened, is calculated according to the engine rotational speed; the theoretical intake air amount corresponding to the state where no exhaust gas of the engine is recirculated to the combustion chamber, is calculated according to the wide-open intake air amount and the intake pressure; the exhaust gas recirculation ratio is calculated using the theoretical intake air amount and the target intake air amount; and the target output torque of the engine is calculated using the target intake air amount and the exhaust gas recirculation ratio. Accordingly, it is not necessary to previously set many maps corresponding to various engine operating conditions for converting the target intake air amount to the target output torque, which makes it possible to accurately calculate the target output torque taking the exhaust gas recirculation ratio into account with a comparatively simple method. Consequently, the output torque control of the engine can accurately be performed by controlling the engine using the calculated target output torque.

The present invention provides another control system including the rotational speed detecting means, intake pressure detecting means for detecting an intake pressure (PBA)

of the engine, the wide-open intake air amount calculating means, the theoretical intake air amount calculating means, intake air amount obtaining means for detecting or estimating an actual intake air amount (GAIR, HGAIR) of the engine, the exhaust gas recirculation ratio calculating means, output torque calculating means, and the control means. The exhaust gas recirculation ratio calculating means calculates an exhaust gas recirculation ratio (REGRT) using the theoretical intake air amount (GATH) and the actual intake air amount (GAIR, HGAIR). The output torque calculating means calculates an output torque (HTRQ) of the engine using the actual intake air amount (GAIR, HGAIR) and the exhaust gas recirculation ratio (REGRT), and the control means controls the engine using the calculated output torque (HTRQ).

With this configuration, the wide-open intake air amount, which is an intake air amount corresponding to the state where the throttle valve is fully opened, is calculated according to the engine rotational speed; the theoretical intake air amount corresponding to the state where no exhaust gas is recirculated to the combustion chamber, is calculated according to the wide-open intake air amount and the intake pressure; the exhaust gas recirculation ratio is calculated using the theoretical intake air amount and the actual intake air amount; and the output torque of the engine is calculated using the actual intake air amount and the exhaust gas recirculation ratio. Accordingly, it is not necessary to previously set many maps corresponding to various engine operating conditions, which makes it possible to accurately calculate the engine output torque taking the exhaust gas recirculation ratio into account with a comparatively simple method. Consequently, the output torque control of the engine can accurately be performed by controlling the engine using the calculated engine output torque.

The present invention provides another control system including the rotational speed detecting means, target output torque calculating means, target intake air amount calculating means, and the control means. The target output torque calculating means calculates a target output torque (TRQCMD) of the engine, and the target intake air amount calculating means includes exhaust gas recirculation ratio calculating means for calculating an exhaust gas recirculation ratio (REGRTTMP) of the engine, and calculates a target intake air amount (GACMD, GACMDMID) of the engine using the target output torque (TRQCMD) and the exhaust gas recirculation ratio (REGRTTMP). The control means controls the engine using the target intake air amount (GACMD, GACMDMID). The exhaust gas recirculation ratio calculating means includes intake pressure estimating means for estimating an intake pressure (HPBATMP) of the engine, the wide-open intake air amount calculating means, and the theoretical intake air amount calculating means. The theoretical intake air amount calculating means calculates the theoretical intake air amount (GATHTMP) according to the wide-open intake air amount (GAWOT) and the intake pressure (HPBATMP). The exhaust gas recirculation ratio calculating means calculates the exhaust gas recirculation ratio (REGRTTMP) using the theoretical intake air amount (GATHTMP) and the target intake air amount (GACMD, GACMDMID).

With this configuration, the target output torque of the engine and the exhaust gas recirculation ratio are calculated, and the target intake air amount of the engine is calculated using the target output torque and the exhaust gas recirculation ratio. The exhaust gas recirculation ratio is calculated as follows: the wide-open intake air amount, which is an intake air amount corresponding to the state where the throttle valve is fully opened, is calculated according to the engine rotational speed; the theoretical intake air amount corresponding to the state where no exhaust gas is recirculated to the combustion chamber, is calculated according to the wide-open intake air amount and the intake pressure; and the exhaust gas recirculation ratio is calculated using the theoretical intake air amount and the target intake air amount. Accordingly, it is not necessary to previously set many maps corresponding to various engine operating conditions for converting the target output torque to the target intake air amount, which makes it possible to accurately calculate the target intake air amount taking the exhaust gas recirculation ratio into account with a comparatively simple method. Consequently, the output torque control of the engine can accurately be performed by controlling the engine using the calculated target intake air amount.

Preferably, the target intake air amount calculating means repeatedly executes the following steps after setting an initial value of a temporary target intake air amount (GACMDMID) until a convergence time at which a difference (DTRQ) between the estimated output torque (TRQTMP) and the target output torque (TRQCMD) becomes equal to or less than a predetermined threshold value (DTRQTH): a first step for calculating an estimated exhaust gas recirculation ratio (REGRTTMP) which is an exhaust gas recirculation ratio corresponding to a state where the temporary target intake air amount (GACMDMID) is supplied to the engine; a second step for calculating an estimated output torque (TRQTMP) of the engine according to the temporary target intake air amount (GACMDMID) and the estimated exhaust gas recirculation ratio (REGRTTMP); and a third step for modifying the temporary target intake air amount (GACMDMID) so that the estimated output torque (TRQTMP) approaches the target output torque (TRQCMD).

With this configuration, the following three steps are repeatedly executed after setting the initial value of the temporary target intake air amount until the convergence time at which the difference between the estimated output torque and the target output torque becomes equal to or less than the predetermined threshold value: the first step for calculating the estimated exhaust gas recirculation ratio which is an exhaust gas recirculation ratio corresponding to the state where the temporary target intake air amount is supplied to the engine; the second step for calculating the estimated output torque of the engine according to the temporary target intake air amount and the estimated exhaust gas recirculation ratio; and the third step for modifying the temporary target intake air amount so that the estimated output torque approaches the target output torque. By repeatedly executing the above three steps, the setting of the target intake air amount is accurately performed taking the exhaust gas recirculation ratio into account, thereby improving the response performance of the control for making the engine output torque coincide with the target output torque.

The present invention provides another control system including the rotational speed detecting means, the intake pressure detecting means, the wide-open intake air amount calculating means, the theoretical intake air amount calculating means, estimated intake air amount calculating means for calculating an estimated intake air amount (HGAIR) which is an estimated value of an actual intake air amount of the engine, the exhaust gas recirculation ratio calculating means, torque detecting means for detecting an output torque (TRQDET) of the engine, and the control means for controlling the engine using the estimated intake air amount (HGAIR). The theoretical intake air amount calculating means calculates a theoretical intake air amount (GATHTMP) according to the wide-open intake air amount (GAWOT) and the detected intake pressure (PBA). The exhaust gas recirculation ratio calculating means calculates an exhaust gas recirculation ratio (REGRTTMP) using the theoretical intake air amount (GATHTMP) and the estimated intake air amount (HGAIR). The estimated intake air amount calculating means calculates the estimated intake air amount (HGAIR) using the detected output torque (TRQDET) and the exhaust gas recirculation ratio (REGRTTMP).

With this configuration, the exhaust gas recirculation ratio is calculated, and the estimated intake air amount, which is an estimated value of the actual intake air amount of the engine, are calculated using the detected output torque and the exhaust gas recirculation ratio. The exhaust gas recirculation ratio is calculated as follows: the wide-open intake air amount, which is an intake air amount corresponding to the state where the throttle valve is fully opened, is calculated according to the engine rotational speed; the theoretical intake air amount corresponding to the state where no exhaust gas is recirculated to the combustion chamber, is calculated according to the wide-open intake air amount and the intake pressure; and the exhaust gas recirculation ratio is calculated using the theoretical intake air amount and the target intake air amount. Accordingly, it is not necessary to previously set many maps corresponding to various engine operating conditions, which makes it possible to accurately calculate the estimated intake air amount taking the exhaust gas recirculation ratio into account with a comparatively simple method. Consequently, by controlling the engine using the calculated estimated intake air amount, the air-fuel ratio control of the engine can accurately be performed without using the intake air flow rate sensor.

When the engine is provided with a valve operating phase characteristic varying mechanism (40) which varies an operating phase (CAIN) of at least one intake valve of the engine, the wide-open intake air amount calculating means preferably calculates the wide-open intake air amount (GAWOT) according to the operating phase (CAIN) of the at least one intake valve.

DETAILED DESCRIPTION OF THE PREFERRED EMBODIMENTS

Preferred embodiments of the present invention will now be described with reference to the drawings.

Figure 1:
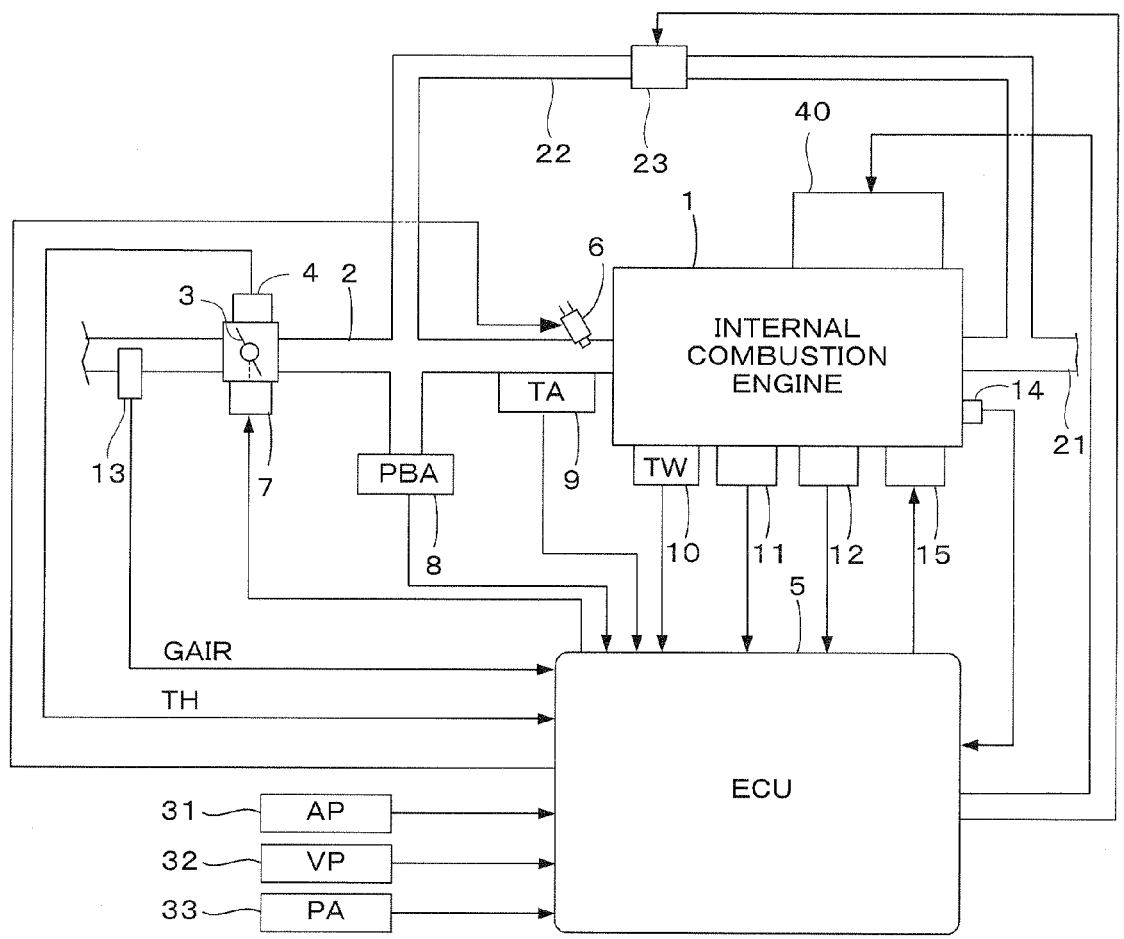
FIG. 1 shows a configuration of an internal combustion engine according to one embodiment of the present invention and a control system therefor.

FIG. 1 is a schematic diagram showing a configuration of an internal combustion engine and a control system therefor according to one embodiment of the present invention. In FIG. 1, an internal combustion engine (hereinafter referred to as "engine") 1 having, for example, four cylinders is provided with intake valves, exhaust valves, and cams for driving the intake valves and the exhaust valves. The engine 1 is provided with a valve operating characteristic varying mechanism 40 as a cam phase varying mechanism for continuously varying the operating phase of the cams for driving the intake valves with reference to a rotational angle of the crank shaft of the engine 1. The valve operating characteristic varying mechanism 40 varies the operating phase of the cam for driving each intake valve, and consequently varies the operating phase of each intake valve.

The engine 1 has an intake passage 2 provided with a throttle valve 3. A throttle valve opening sensor 4 for detecting a throttle valve opening TH is connected to the throttle valve 3. The detection signal of the throttle valve opening sensor 4 is supplied to an electronic control unit (hereinafter referred to as "ECU") 5. An actuator 7 for actuating the throttle valve 3 is connected to the throttle valve 3, and the operation of the actuator 7 is controlled by the ECU 5.

An exhaust gas recirculation passage 22 is disposed between an exhaust passage 21 and the intake passage 2, and connected to the intake passage 2 downstream of the throttle valve 3. The exhaust gas recirculation passage 22 is provided with an exhaust gas recirculation control valve 23 for controlling a recirculation amount of exhaust gases. Operation of the exhaust gas recirculation control valve 23 is controlled by the ECU 5.

An intake air flow rate sensor 13 for detecting an intake air flow rate GAIR of the engine 1 is disposed in the intake passage 2. The detection signal of the intake air flow rate sensor 13 is supplied to the ECU 5.

Fuel injection valves 6 are inserted into the intake passage 2 at locations intermediate between the cylinder block of the engine 1 and the throttle valves 3 and slightly upstream of the respective intake valves (not shown). These fuel injection valves 6 are connected to a fuel pump (not shown), and electrically connected to the ECU 5. A valve opening period of each fuel injection valve 6 is controlled by a signal output from the ECU 5.

A spark plug 15 of each cylinder of the engine 1 is connected to the ECU 5. The ECU 5 supplies an ignition signal to each spark plug 15 and controls the ignition timing.

An intake pressure sensor 8 for detecting an intake pressure PBA and an intake air temperature sensor 9 for detecting an intake air temperature TA are disposed downstream of the throttle valve 3. Further, an engine coolant temperature sensor 10 for detecting an engine coolant temperature TW is mounted on the body of the engine 1. The detection signals from these sensors are supplied to the ECU 5.

A crank angle position sensor 11 and a cam angle position sensor 12 are connected to the ECU 5. The crank angle position sensor 11 is provided to detect a rotational angle of a crankshaft (not shown) of the engine 1, and the cam angle position sensor 12 is provided to detect a rotational angle of the camshaft to which the cams for driving the intake valves of the engine 1 are fixed. A signal corresponding to the rotational angle detected by the crank angle position sensor 11 and a signal corresponding to the rotational angle detected by the cam angle position sensor 12 are supplied to the ECU 5. The crank angle position sensor 11 generates one pulse (hereinafter referred to as "CRK pulse") at every constant crank angle period (e.g., a period of 6 degrees) and a pulse for specifying a predetermined angle position of the crankshaft. The cam angle position sensor 12 generates a pulse at a predetermined crank angle position for a specific cylinder of the engine 1 (this pulse will be hereinafter referred to as "CYL pulse"). The cam angle position sensor 12 further generates a pulse at a top dead center (TDC) starting the intake stroke in each cylinder (this pulse will be hereinafter referred to as "TDC pulse"). These pulses are used to control the various timings such as a fuel injection timing and the ignition timing, as well as to detect an engine rotational speed NE. An actual operating phase CAIN of the camshaft is detected based on the correlation between the TDC pulse output from the cam angle position sensor 12 and the CRK pulse output from the crank angle position sensor 11.

A knock sensor 14 for detecting a high frequency vibration is mounted on a proper position of the engine 1. The detection signal of the knock sensor 14 is supplied to the ECU 5. Further, an accelerator sensor 31, a vehicle speed sensor 32, and an atmospheric pressure sensor 33 are also connected to the ECU 5. The accelerator sensor 31 detects a depression amount AP of an accelerator pedal of the vehicle driven by the engine 1 (the depression amount will be hereinafter referred to as "accelerator operation amount"). The vehicle speed sensor 32 detects a running speed (vehicle speed) VP of the vehicle. The atmospheric pressure sensor 33 detects an atmospheric pressure PA. The detection signals from these sensors are supplied to the ECU 5.

The valve operating characteristic varying mechanism 40 includes a solenoid valve for continuously varying an operating phase of each intake valve. An opening of the solenoid valve is continuously varied to change the operating phase of each intake valve. The operating phase CAIN of the camshaft is used as a parameter indicative of the operating phase of the intake valve (hereinafter referred to as "intake valve operating phase CAIN"). It is to be noted that a specific configuration of the valve operating characteristic varying mechanism 40 is described, for example, in Japanese Patent Laid-open No. 2000-227013.

Figure 2:
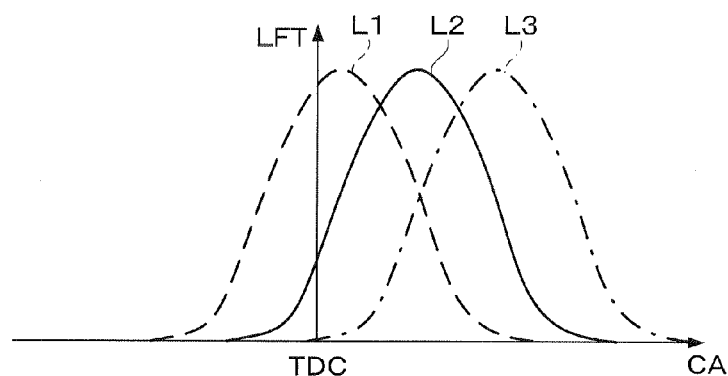
FIG. 2 shows changes in the operating phase of the intake valve.

According to the valve operating characteristic varying mechanism 40, the intake valve is driven with a phase from the most advanced phase shown by the broken line L1 in FIG. 2 to the most retarded phase shown by the dot-and-dash line L3, depending on a change in the operating phase CAIN of the camshaft. In FIG. 2, the characteristic shown by the solid line L2 is the center of the variable phase range. In this embodiment, the intake valve operating phase CAIN is defined as an advancing angular amount from the most retarded phase.

The ECU 5 includes an input circuit having various functions including a function of shaping the waveforms of input signals from the various sensors, a function of correcting the voltage levels of the input signals to a predetermined level, and a function of converting analog signal values into digital signal values. The ECU 5 further includes a central processing unit (hereinafter referred to as "CPU"), a memory circuit, and an output circuit. The memory circuit preliminarily stores various operating programs to be executed by the CPU and the results of computation or the like by the CPU. The output circuit supplies drive signals to the actuator 7, the fuel injection valves 6, the ignition plugs 15, the exhaust gas recirculation control valve 23, and the valve operating characteristic varying mechanism 40.

The CPU in the ECU 5 controls an ignition timing, an opening of the throttle valve 3, an amount of fuel to be supplied to the engine 1 (the opening period of each fuel injection valve 6), a recirculation amount of the exhaust gases, and the valve operating characteristic varying mechanism 40, according to the detection signals from the above-described sensors.

Figure 3:
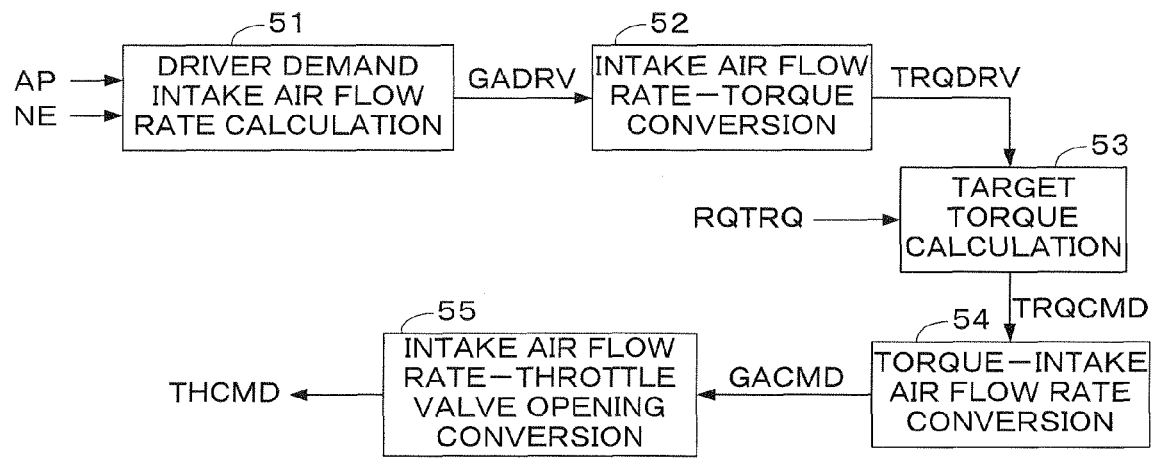
FIG. 3 is a block diagram showing a configuration of the module for performing the torque demand control.

In this embodiment, the throttle valve opening TH is controlled with the torque demand control so that the output torque TRQ of the engine 1 coincides with the target torque TRQCMD. FIG. 3 is a block diagram showing a configuration of a torque demand control module which performs the torque demand control, and the function of each block shown in FIG. 3 is implemented by the calculation process of the CPU in the ECU 5.

The torque demand control module shown in FIG. 3 includes a driver demand intake air flow rate calculation block 51, an intake air flow rate-torque conversion block 52, a target torque calculation block 53, a torque-intake air flow rate conversion block 54, and an intake air flow rate-throttle valve opening conversion block 55.

Figure 10:
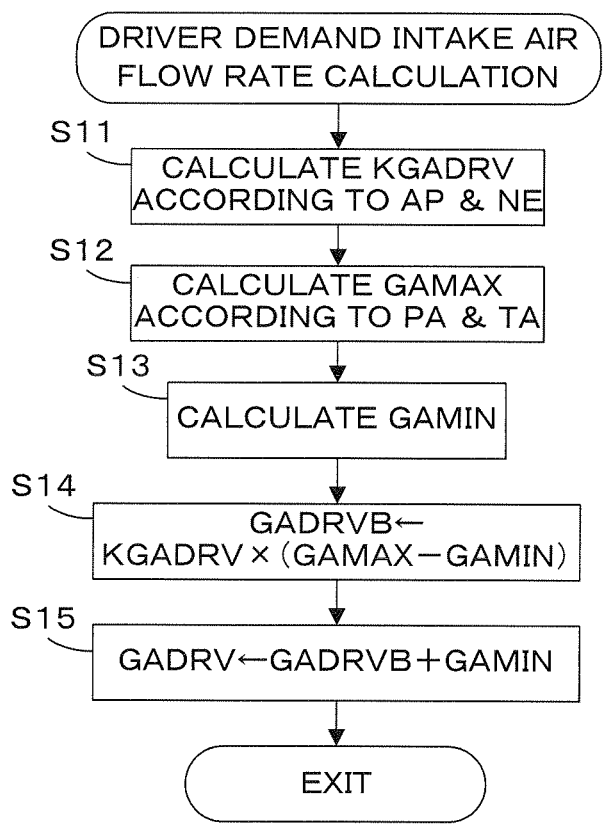
FIG. 10 is a flow chart of a calculation process in the driver demand intake air flow rate calculation block shown in FIG. 3.

The driver demand intake air flow rate calculation block 51 executes the process shown in FIG. 10, and calculates a driver demand intake air flow rate GADRV according to the accelerator operation amount AP and the engine rotational speed NE. The driver demand intake air flow rate GADRV is an intake air flow rate corresponding to the engine output the driver of the vehicle demands.

Figure 12:
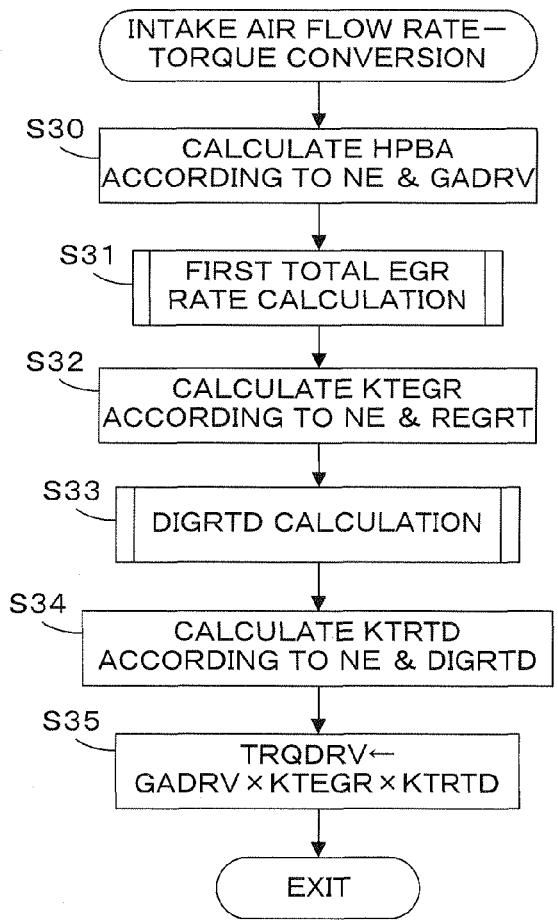
FIG. 12 is a flow chart of a calculation process in the intake air flow rate-torque conversion block shown in FIG. 3.

The intake air flow rate-torque conversion block 52 executes the process shown in FIG. 12, and convert the driver demand intake air flow rate GADRV to a driver demand torque TRQDRV. In this conversion, the retard correction amount of the ignition timing and the exhaust gas recirculation ratio are taken into account. The target torque calculation block 53 calculates a target torque TRQCMD of the engine 1 according to the driver demand torque TRQDRV and a torque control demand RQTRQ from other control units. The torque control demand RQTRQ includes, for example, a torque reduction demand from the transmission control unit for controlling the transmission, a torque reduction demand or a temporary torque increase demand from a vehicle stabilization control unit. That is, the target torque calculation block 53 basically sets the target torque TRQCMD to the driver demand torque TRQCMD, and modifies the target torque TRQCMD according to the torque control demand RQTRQ.

Figure 16:
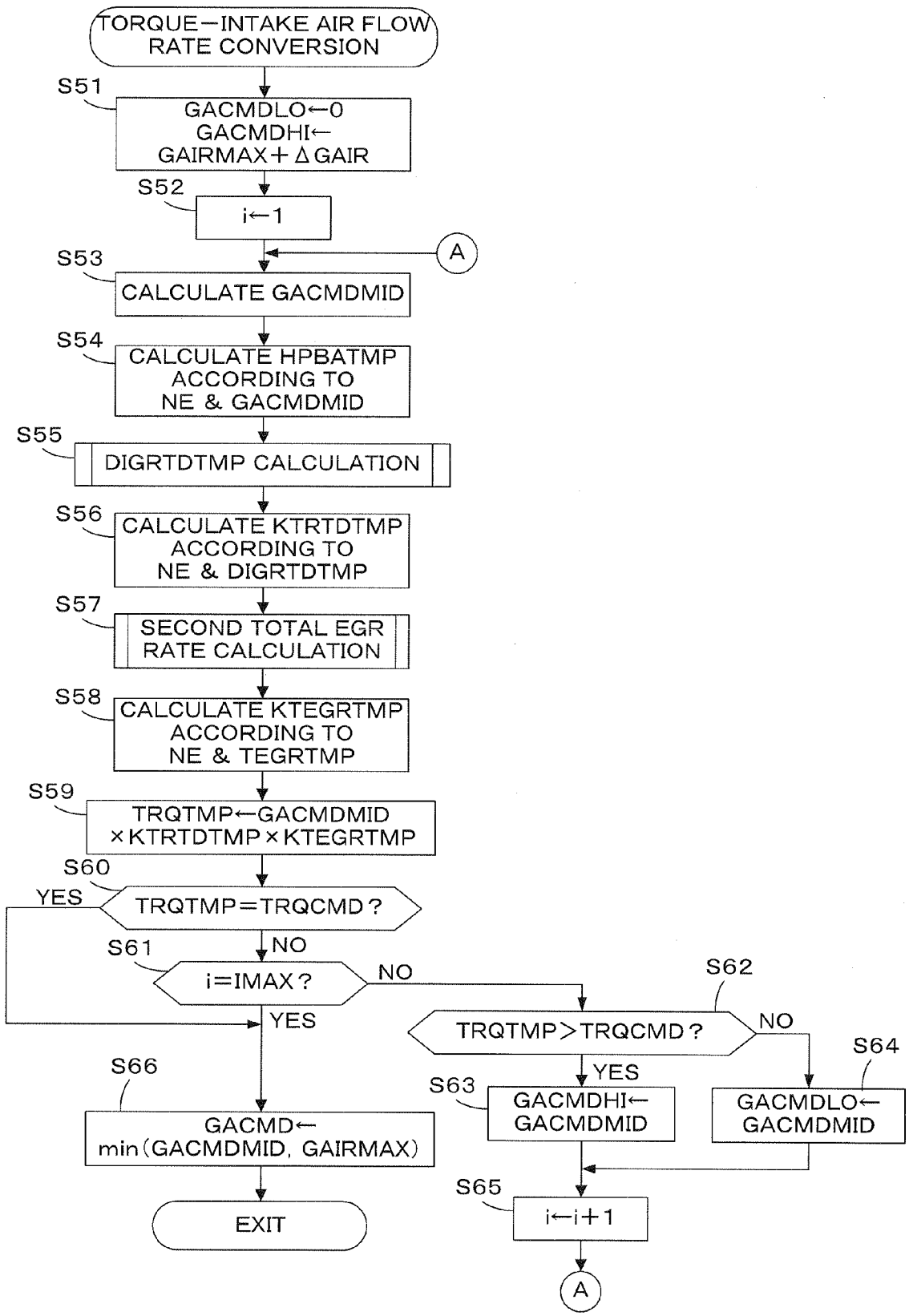
FIG. 16 is a flow chart of a calculation process in the torque-intake air flow rate conversion block shown in FIG. 3.

The torque-intake air flow rate conversion block 54 executes the process shown in FIG. 16, and converts the target torque TRQCMD to a target intake air flow rate GACMD. In this conversion, the retard correction amount of the ignition timing and the exhaust gas recirculation ratio are taken into account. The intake air flow rate-throttle valve opening conversion block 55 converts the target intake air flow rate GACMD with a known method, to a target throttle valve opening THCMD which is a target opening of the throttle valve 3.

The CPU in the ECU 5 controls the actuator 7 so that the throttle valve opening TH coincides with the target throttle valve opening THCMD.

In the intake air flow rate-torque conversion block 52 and the torque-intake flow rate conversion block 54, the conversion calculation is performed according to the exhaust gas recirculation ratio. Therefore, the calculation method of the exhaust gas recirculation ratio in this embodiment is first described in detail with reference to FIGS. 4-9.

Figure 4:
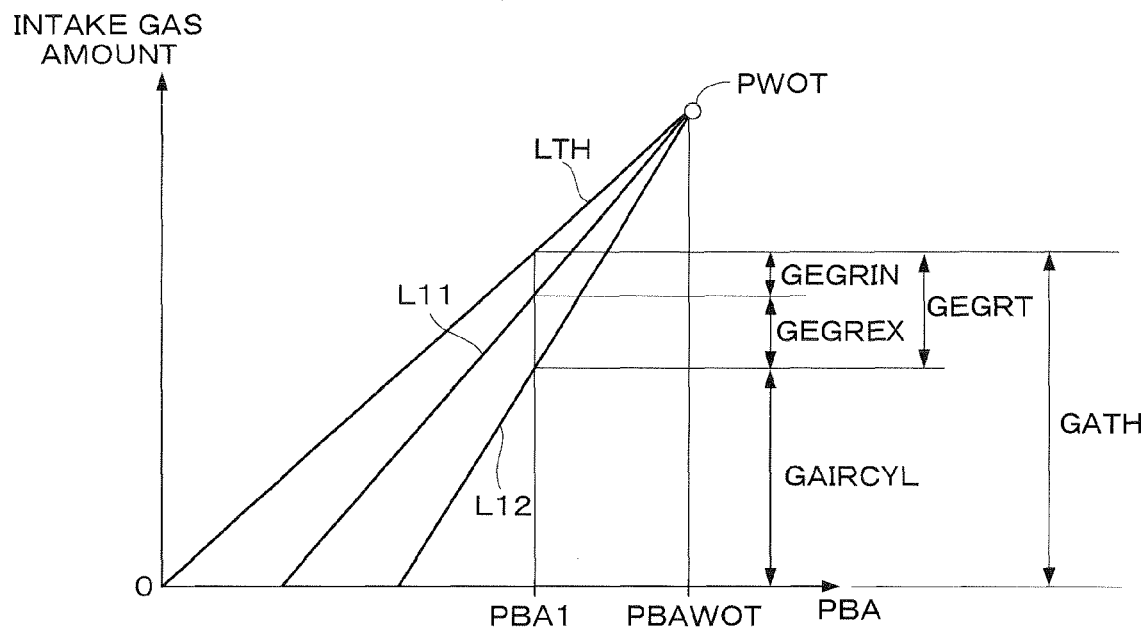
FIG. 4 is a graph for illustrating a calculation method of the total exhaust gas recirculation ratio (REGRT)

FIG. 4 is a graph for illustrating a calculation method of a total exhaust gas recirculation ratio (hereinafter referred to as "total EGR ratio") REGRT in this embodiment. FIG. 4 shows a relationship between the intake pressure PBA and an amount of gases supplied to the engine (an amount of air+an amount of exhaust gases). The total EGR ratio REGRT is a ratio of the total exhaust gas recirculation amount with respect to the total intake gas amount (theoretical intake air amount GATH) (refer to the equation (2) described later). The total exhaust gas recirculation amount is a sum of the internal exhaust gas recirculation amount and the external exhaust gas recirculation amount through the exhaust gas recirculation passage 22.

In FIG. 4, the operating point PWOT corresponds to a state where the throttle valve 3 is fully opened, and indicates the theoretical operating point at which no external exhaust gas recirculation is performed, and no internal exhaust gas recirculation is performed. At the operating point PWOT, the intake air amount takes the maximum value under the condition that the engine rotational speed NE is constant. It is to be noted that the residual gas ratio (the internal exhaust gas recirculation ratio) does not actually become "0" in the state where the throttle valve 3 is fully opened. However, the internal exhaust gas recirculation ratio takes the minimum value, since the intake pressure PBAWOT becomes almost equal to the atmospheric pressure PA. The straight line LTH passing the operating point PWOT and the starting point, indicates a theoretical relationship between the intake air amount and the intake pressure, wherein no external exhaust gas recirculation and no internal exhaust gas recirculation is performed. This straight line LTH is hereinafter referred to as "theoretical intake air amount straight line LTH". The line L11 indicates a relationship corresponding to the state where only the internal exhaust gas recirculation is performed, and the line L12 indicates a relationship corresponding to the state where both of the internal exhaust gas recirculation and the external exhaust gas recirculation are performed. It is to be noted that the lines L11 and L12 are indicated as straight lines for explanation, although they are not actually straight lines.

If the gas amount on the theoretical intake air amount straight line LTH corresponding to the state where the intake pressure is equal to PBA1 is defined as a "theoretical intake air amount GATH", the theoretical intake air amount GATH is expressed with the following equation (1). In the equation (1), GACYL indicates an intake air amount (fresh air amount), and GEGRIN, GEGREX, and GEGRT respectively indicate an internal exhaust gas recirculation amount, an external exhaust gas recirculation amount, and a total exhaust gas recirculation amount.

$$GATH = GACYL + GEGRIN + GEGREX \quad (1)$$
$$= GACYL + GEGRT$$

Accordingly, the total EGR ratio REGRT is calculated by the following equation (2).

$$REGRT = GEGRT / GATH \quad (2)$$
$$= (GATH - GACYL) / GATH$$

Figure 5:
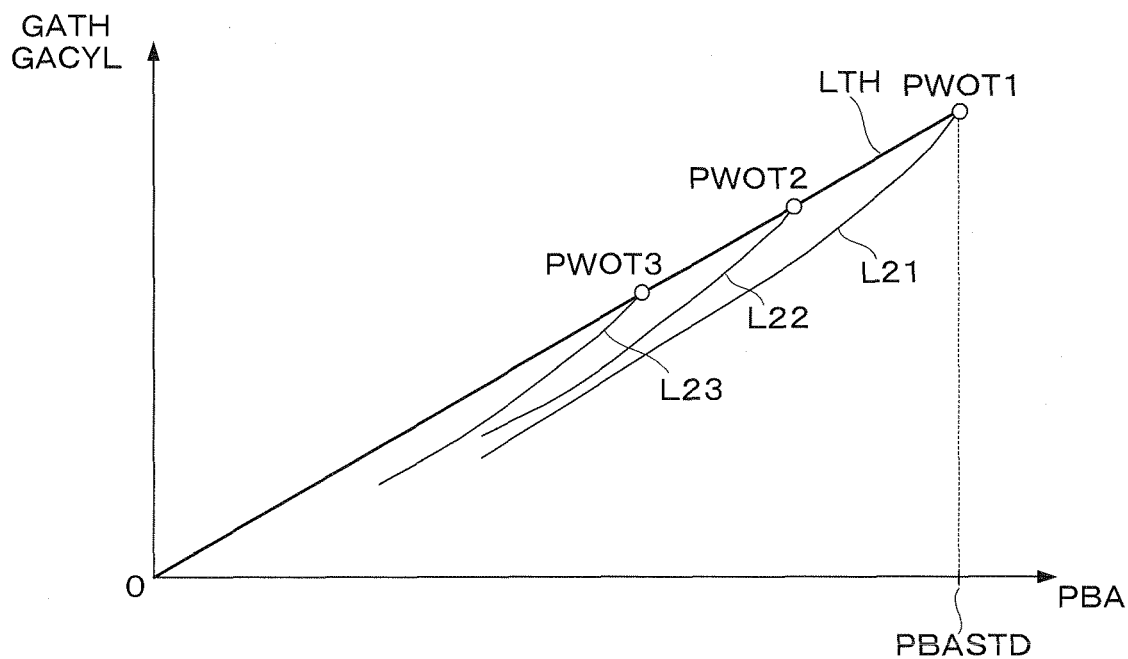
FIG. 5 is a graph for illustrating changes in the theoretical wide-open air amount (GAWOT) corresponding to changes in the atmospheric pressure.

FIG. 5 is a graph for illustrating a case where the atmospheric pressure changes. In FIG. 5, the wide-open operating point PWOT1 is an operating point corresponding to a reference state in which the intake pressure PBA is equal to a reference intake pressure PBASTD (for example, 100 kPa (750 mmHg)). When the vehicle moves to a higher altitude place and the atmospheric pressure falls, the operating point PWOT1 moves to the operating point PWOT2 and next to the operating point PWOT3 on the theoretical intake air amount straight line LTH. The curves L21-L23 starting from the operating points PWOT1-PWOT3 respectively indicate the intake air amount GACYL which is obtained by taking the internal exhaust gas recirculation into account (i.e., when no external exhaust gas recirculation is performed).

As described above, in this embodiment, it is not necessary to change the theoretical intake air amount straight line LTH depending on changes in the atmospheric pressure, and the total EGR ratio REGRT can accurately be calculated also at high altitude places.

However, it is necessary to perform an air density correction depending on changes in the intake air temperature TA, and the air density correction is performed according to the detected intake air temperature TA using the following equation (3). In the equation (3), TASTD is an intake air temperature in a reference condition (for example, 25 degrees C.), and GAWOTSTD is an intake air amount corresponding to the wide-open operating point PWOT in the reference condition. GAWOTSTD is hereinafter referred to as "reference theoretical wide-open air amount GAWOTSTD". Further, GAWOT is an intake air amount corresponding to the wide-open operating point PWOT in the operating condition of the detected intake air temperature TA. GAWOT is hereinafter referred to as "theoretical wide-open air amount GAWOT". "n" in the equation (3) is a constant which is empirically set to a value from "0" to "1", for example, set to "0.5".

$$GAWOT = GAWOTSTD \times \left(\frac{TASTD + 273}{TA + 273}\right)^n \quad (3)$$

Figure 6:
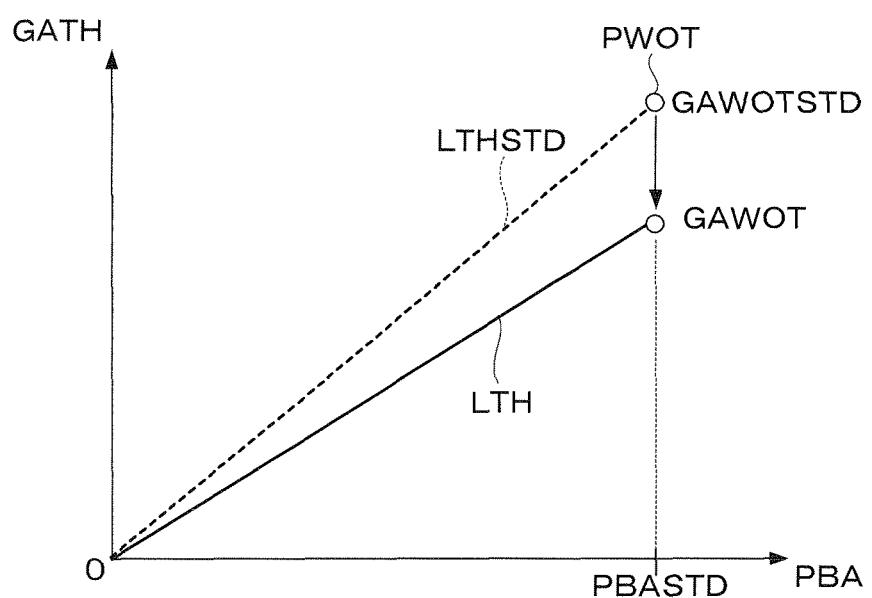
FIG. 6 is a graph for illustrating a correction according to the intake air temperature.

The straight line LTHSTD shown in FIG. 6 is a theoretical intake air amount straight line in the reference condition, and the straight line LTH is a theoretical intake air amount straight line corresponding to the detected intake air temperature TA. It is to be noted that FIG. 6 corresponds to an example in which the detected intake air temperature TA is higher than the reference intake air temperature TASTD.

Figure 7:
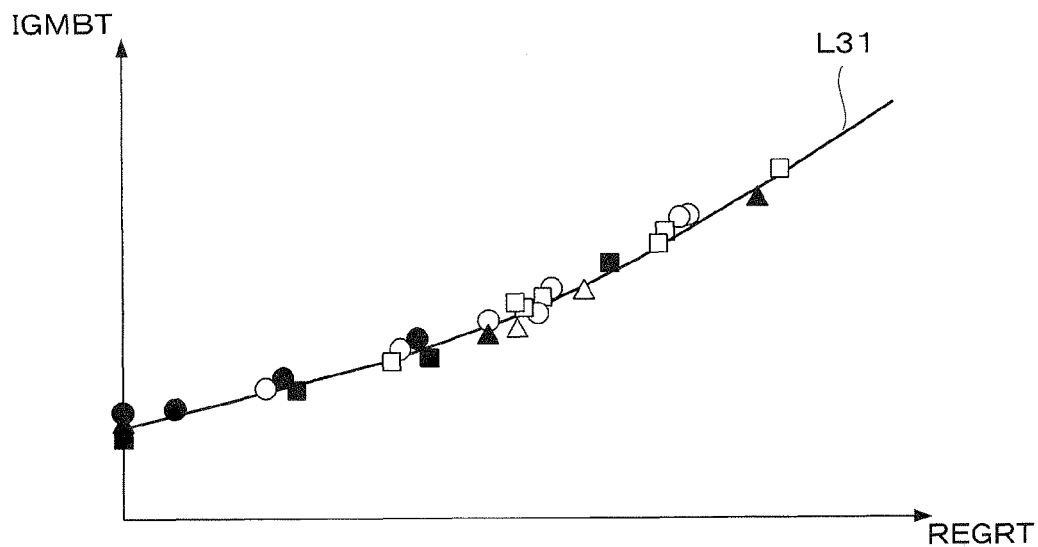
FIG. 7 shows a relationship between the total exhaust gas recirculation ratio (REGRT) and the optimal ignition timing (IGMBT)

FIG. 7 is a graph for illustrating a relationship between the total EGR ratio REGRT and an optimal ignition timing IGMBT (the engine rotational speed NE is fixed). The optimal ignition timing IGMBT is an ignition timing at which the engine output torque becomes the maximum. In FIG. 7, the black circles (●) and the white circles (○) correspond to an operating condition where the intake valve operating phase CAIN is "0" degree, the black squares (■) and the white squares (□) correspond to an operating condition where the intake valve operating phase CAIN is "20" degrees, and the black triangles (▲) and the white triangles (△) correspond to an operating condition where the intake valve operating phase CAIN is "45" degrees. Further, the black symbols (●, ■, and ▲) correspond to the case where no external exhaust gas recirculation is performed (only the internal exhaust gas recirculation is performed), and the white symbols (○, □, and △) correspond to the case where the external exhaust gas recirculation is performed (both of the internal exhaust gas recirculation and the external exhaust gas recirculation are performed).

According to FIG. 7, it is confirmed that the relationship between the total EGR ratio REGRT and the optimal ignition timing IGMBT depends neither on the operating phase CAIN of the intake valve nor on whether the external exhaust gas recirculation is performed or not, i.e., the curve L31 can represent the relationship between REGRT and IGMBT. Accordingly, only one optimal ignition timing calculation map (IGMBT map) set according to the engine rotational speed NE and the total EGR ratio REGRT, makes it possible to set the optimal ignition timing corresponding to all engine operating conditions. Consequently, the manpower for setting maps can greatly be reduced.

Figure 8A:
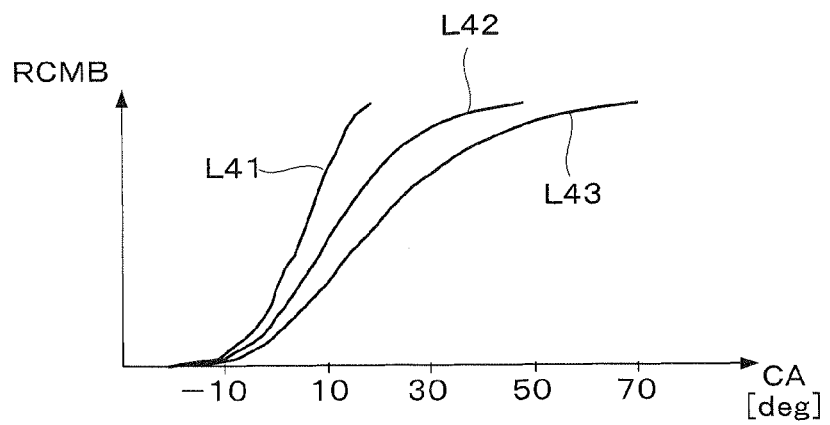
FIGS. 8A and 8B show changes in the mass combustion rate (RCMB)
Figure 8B:
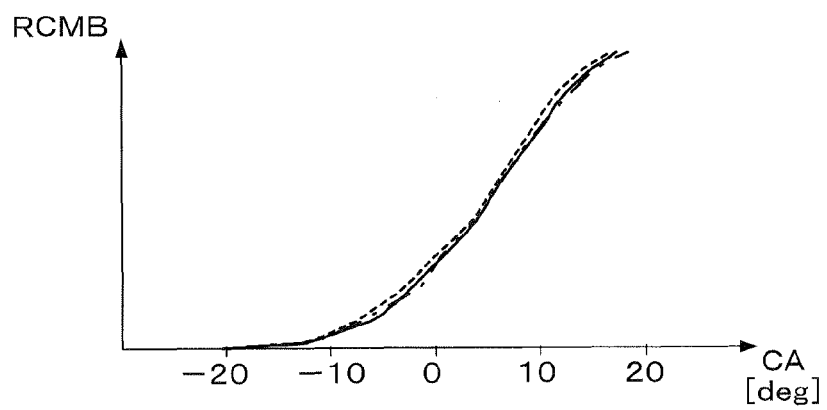

FIGS. 8A and 8B show changes in the mass combustion rate RCMB of the air-fuel mixture sucked in the combustion chamber (the horizontal axis indicates the crank angle CA). FIG. 8A shows changes in the mass combustion rate RCMB in a condition where the charging efficiency η c is constant and the total EGR ratio REGRT is changed. Specifically, the curves L41-L43 correspond respectively to operating conditions in which the total EGR ratio REGRT is set to "6.3%", "16.2%, and "26.3%". The curve L41 indicates the fastest burning speed. That is, it is confirmed that the total EGR ratio REGRT is a main factor which changes the burning speed of the air-fuel mixture.

On the other hand, FIG. 8B shows changes in the mass combustion rate RCMB in a condition where the total EGR ratio REGRT is constant and the charging efficiency η c is changed (the solid line, the dashed line and the dot-and-dash line). The three lines indicated in FIG. 8B almost overlap with each other, which shows that the burning speed of the air-fuel mixture hardly changes even if the charging efficiency η c is changed. Therefore, it is preferable that the optimal ignition timing IGMBT is set not according to the charging efficiency η c (the fresh intake air amount) but according to the total EGR ratio REGRT.

Figure 9:
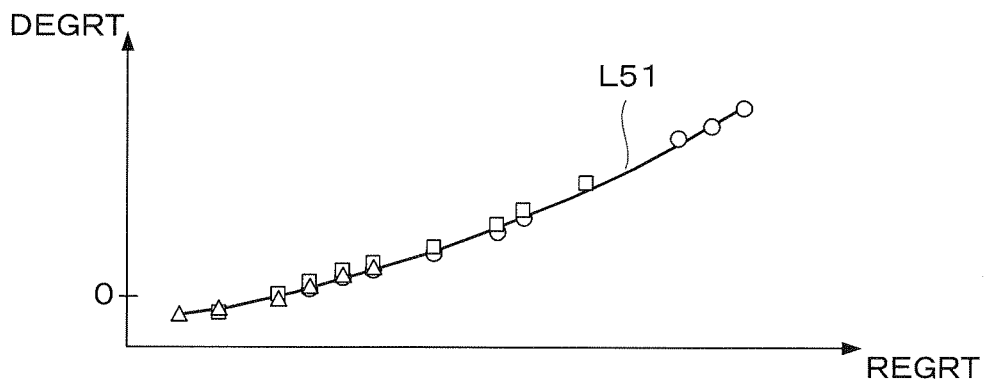
FIG. 9 shows a relationship between the total exhaust gas recirculation ratio (REGRT) and an EGR knock correction amount (DEGRT)

FIG. 9 shows a relationship between the total EGR ratio REGRT and an EGR knock correction amount DEGRT of the ignition timing (the engine rotational speed NE is fixed). The EGR knock correction amount DEGRT is an ignition timing correction amount (a correction amount in the advancing direction) applied to a calculation of a knock correction amount IGKNOCK, in order to perform the correction corresponding to changes in the exhaust gas recirculation amount. The symbols ○, □, and △ in FIG. 9 indicate data corresponding to three different charging efficiencies η c, and it is confirmed that the relationship does not depend on the charging efficiency η c. Accordingly, the curve L51 can represent the relationship between the total EGR ratio REGRT and the EGR knock correction amount DEGRT under the condition that the engine rotational speed NE is fixed. Therefore, the EGR knock correction amount DEGRT can appropriately be set by using the DEGRT map set according to the engine rotational speed NE and the total EGR ratio REGRT. It is to be noted that a modification according to the intake valve operating phase CAIN may be necessary due to differences in the engine characteristics, although the relationship indicated with the curve L51 is basically independent of the intake valve operating phase CAIN. In such case, two or more tables corresponding to different intake valve operating phases CAIN may be used, or the correction according to the intake valve operating phase CAIN may be performed.

FIG. 10 is a flow chart of the process executed in the driver demand intake air flow rate calculation block 51 shown in FIG. 3. This process is executed at predetermined time intervals (for example, 10 milliseconds) by the CPU in the ECU 5.

Figure 11:
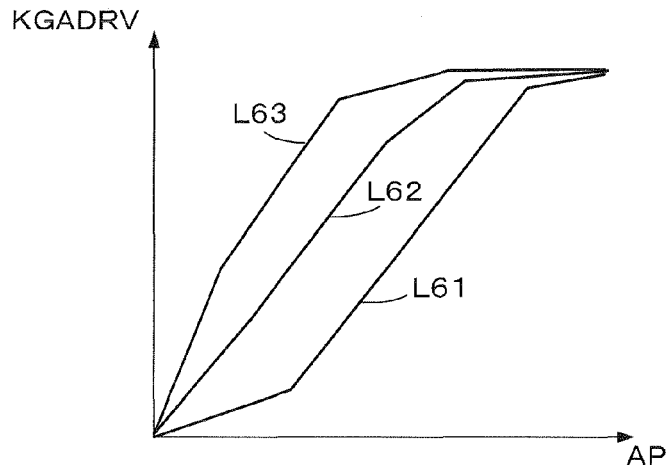
FIG. 11 shows a map referred to in the process of FIG. 10.

In step S11, a KGADRV map shown in FIG. 11 is retrieved according to the accelerator operation amount AP and the engine rotational speed NE, to calculate a driver demand coefficient KGADRV. The driver demand coefficient KGADRV is a coefficient indicative of a ratio of the intake air flow rate necessary for obtaining the engine output that the driver of the vehicle demands (the output indicated by the accelerator operation amount AP), with respect to the entire controllable intake air flow rate. The driver demand coefficient KGADRV is set to a value between "0" and "1". The KGADRV map is basically set so that the driver demand coefficient KGADRV increases as the accelerator operation amount AP increases. The lines L61-L63 shown in FIG. 11 respectively correspond to predetermined engine rotational speeds NE61, NE62, and NE63 (NE61>NE62>NE63).

In step S12, a maximum intake air flow rate GAMAX is calculated by retrieving a map (not shown) which is set according to the atmospheric pressure PA and the intake air temperature TA. The maximum intake air flow rate GAMAX is an intake air flow rate in the state where the throttle valve 3 is fully opened.

In step S13, a minimum intake air flow rate GAMIN is calculated. The minimum intake air flow rate GAMIN is an intake air flow rate which is necessary for obtaining the minimum torque TRQMIN in order to maintain rotation of the engine 1 when the accelerator operation amount AP is equal to "0". The minimum torque TRQMIN, which usually corresponds to a sum of the friction loss and the pumping loss in the engine 1, can be calculated by a known method.

In step S14, the driver demand coefficient KGADRV, the maximum intake air flow rate GAMAX, and the minimum intake air flow rate GAMIN are applied to the following equation (4) to calculate a basic driver demand intake air flow rate GADRVB.

$$GADRVB = KGADRV \times (GAMAX - GAMIN) \quad (4)$$

In step S15, the basic driver demand intake air flow rate GADRVB and the minimum intake air flow rate GAMIN are applied to the following equation (5) to calculate the driver demand intake air flow rate GADRV.

$$GADRV = GADRVB + GAMIN \quad (5)$$

FIG. 12 is a flow chart of the calculation process in the intake air flow rate-torque conversion block 52 shown in FIG. 3. This process is executed at predetermined time intervals (for example, 10 milliseconds) by the CPU in the ECU 5.

Figure 13A:
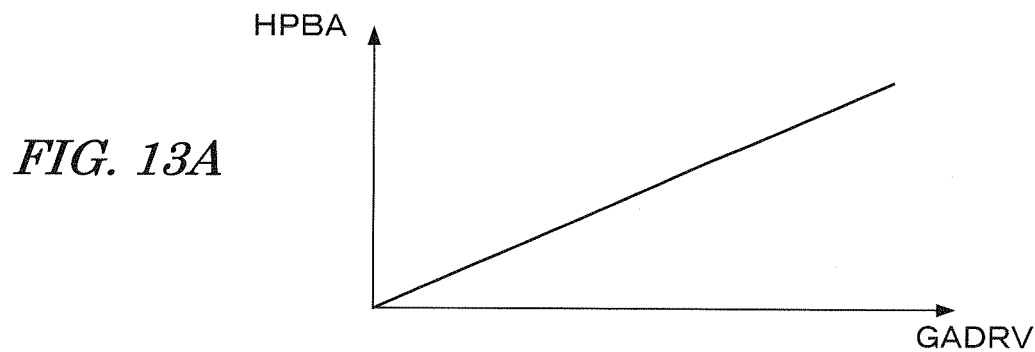
FIGS. 13A-13C show maps referred to in the process of FIG. 12.

In step S30, a HPBA map is retrieved according to the engine rotational speed NE and the driver demand intake air flow rate GADRV to calculate an estimated intake pressure HPBA. The HPBA map is set, as shown in FIG. 13A, so that the estimated intake pressure HPBA is substantially proportional to the driver demand intake air flow rate GADRV.

Figure 14:
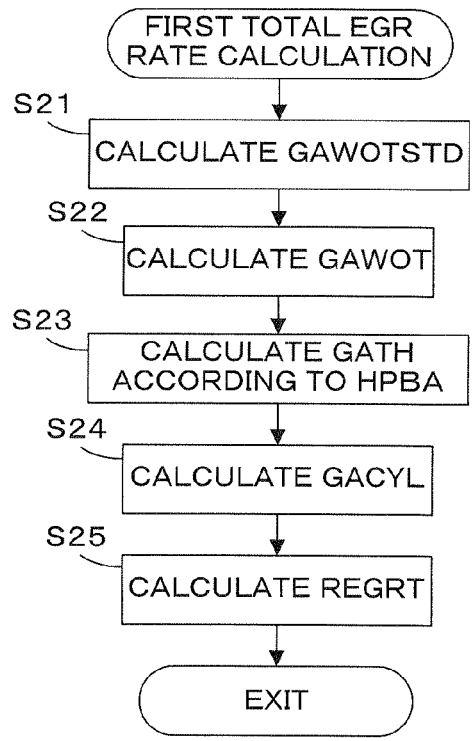
FIG. 14 is a flow chart of an exhaust gas recirculation ratio calculation process executed in the process of FIG. 12.

In step S31, a first total EGR ratio calculation process shown in FIG. 14 is executed. In step S21 of FIG. 14, a GAWOTSTD map (not shown) set according to the engine rotational speed NE and the intake valve operating phase CAIN is retrieved to calculate the reference theoretical wide-open air amount GAWOTSTD. In step S22, the correction is performed according to the intake air temperature TA using the above-described equation (3), to calculate the theoretical wide-open air amount GAWOT.

In step S23, the estimated intake pressure HPBA is applied to the following equation (11) to calculate the theoretical intake air amount GATH.

$$GATH = GAWOT \times HPBA/PBASTD \quad (11)$$

In step S24, the driver demand air flow rate GADRV [g/sec] is applied to the following equation (12) and converted to the intake air amount GACYL in one intake stroke of one cylinder. KC in the equation (12) is a conversion coefficient.

$$GACYL = GADRV \times KC/NE \quad (12)$$

In step S25, the total EGR ratio REGRT is calculated with the above-described equation (2).

Figure 13B:
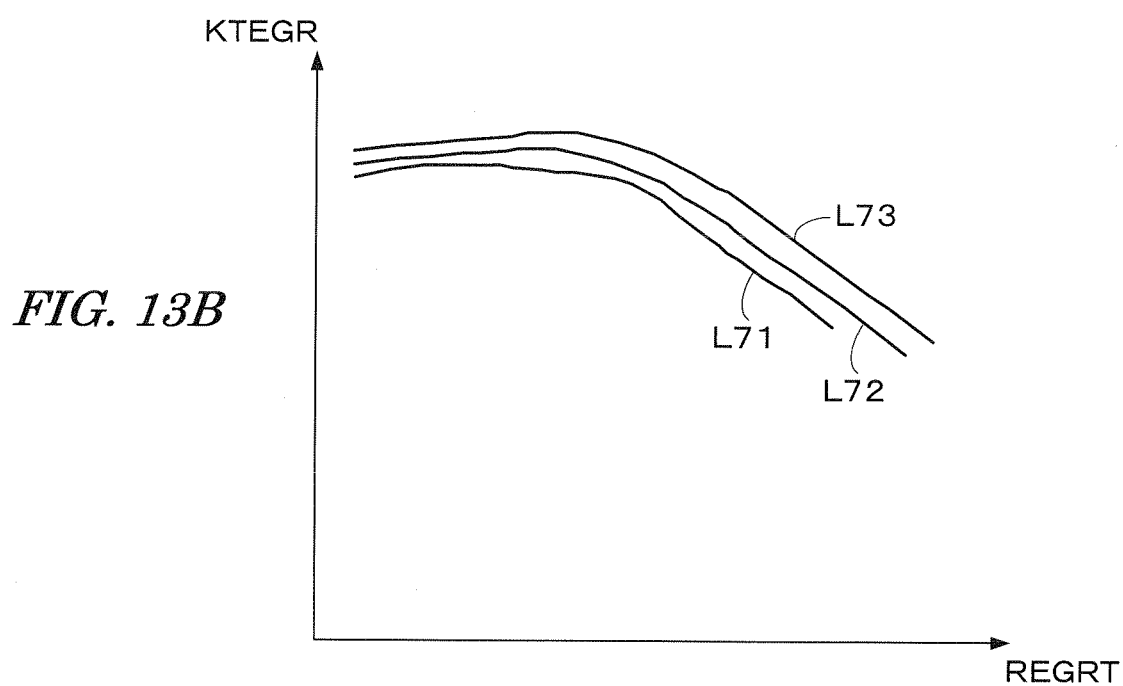

Returning to FIG. 12, in step S32, a KTEGR map shown in FIG. 13B is retrieved according to the engine rotational speed NE and the total EGR ratio REGRT, to calculate an EGR correction conversion coefficient KTEGR. In FIG. 13B, the curves L71-L73 respectively correspond to predetermined engine rotational speeds NE71, NE72, and NE73 (NE71<NE72<NE73). Specifically, the KTEGR map is set in the range where the total EGR ratio REGRT is greater than about "0.1" so that the EGR correction conversion coefficient KTEGR decreases as the total EGR ratio REGRT increases, and the EGR correction conversion coefficient KTEGR increases as the engine rotational speed NE increases. In this embodiment, the EGR correction conversion coefficient KTEGR is defined as a parameter obtained by multiplying a conversion factor for converting an air flow rate [g/sec] to a torque [Nm] by a correction coefficient for correcting the torque reduction caused by increase in the exhaust gas recirculation ratio.

Figure 15:
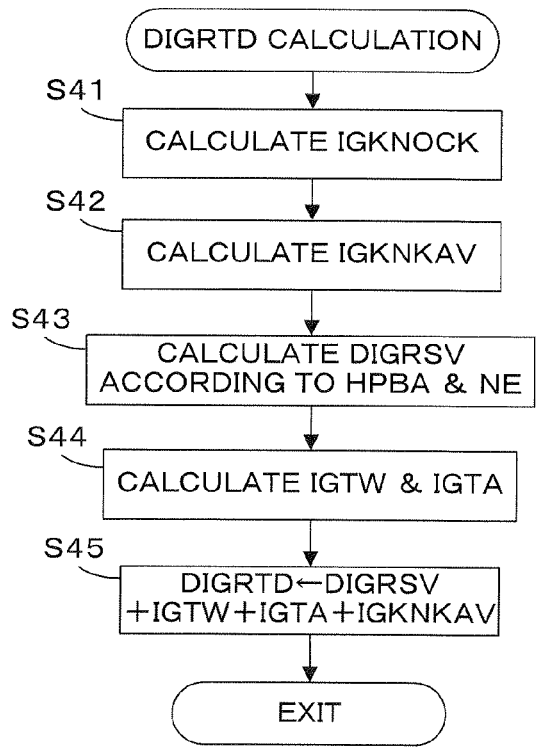
FIG. 15 is a flow chart of an ignition timing retard correction amount calculation process executed in the process of FIG. 12.

In step S33, a DIGRTD calculation process shown in FIG. 15 is executed to calculate a retard correction amount DIGRTD of the ignition timing.

In step S41 of FIG. 15, a knock correction amount IGKNOCK is calculated according to the occurrence state of knocking in the engine 1. Specifically, the knock correction amount IGKNOCK is increased by a predetermined amount when a knocking is detected based on the output signal of the knock sensor 14, and is gradually decreased during the period in which no knocking is detected. As for the knocking detection method and the calculation method of the knock correction amount IGKNOCK, a known method shown for example in Japanese patent laid-open No. 2004-353473 is used. It is to be noted that, in this embodiment, the correction with the EGR knock correction amount DEGRT is performed.

In step S42, a moving average IGKNKAV of the knock correction amount IGKNOCK (hereinafter referred to as "averaged knock correction amount IGKNKAV") is calculated by the following equation (13). In the Equation (13), "k" is a discrete time digitized with the calculation period of the knock correction amount IGKNOCK, and NAV is a predetermined value which is set, for example, "10". The discrete time k takes a value of "0" corresponding to the present time, and increases as the time goes back.

$$IGKNKAV = \sum_{k=0}^{NAV-1} IGKNOCK(k)/NAV \quad (13)$$

In step S43, an estimated basic retard correction amount DIGRSV is calculated by retrieving a map according to the estimated intake pressure HPBA and the engine rotational speed NE. In a high load operating condition in which the intake pressure is high, the knock limit ignition timing IGKNK, which corresponds to a lower limit of the ignition timing range where a knocking may often occur, is smaller than the optimal ignition timing IGMBT (i.e., the knock limit ignition timing IGKNK takes a value in the retard side with respect to the optimal ignition timing IGMBT). Therefore, a knocking is prevented from occurring by applying the estimated basic retard correction amount DIGRSV to calculating the ignition timing IGLOG.

In step S44, a coolant temperature correction amount IGTW is calculated according to the engine coolant temperature TW, and an intake air temperature correction amount IGTA is calculated according to the intake air temperature TA. In step S45, the averaged knock correction amount IGKNKAV, the estimated basic retard correction amount DIGRSV, the coolant temperature correction amount IGTW, and the intake air temperature correction amount IGTA are applied to the following equation (14) to calculate an estimated retard correction amount DIGRTD.

$$DIGRTD = DIGRSV + IGTW + IOTA + IGKNKAV \quad (14)$$

Figure 13C:
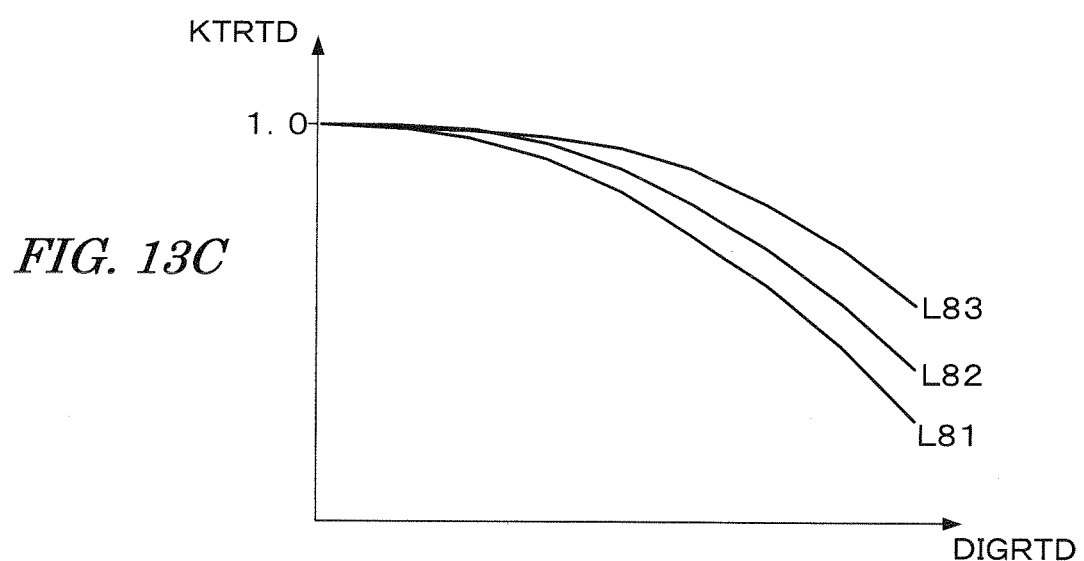

Returning to FIG. 12, in step S34, a KTRTD map shown in FIG. 13C is retrieved according to the engine rotational speed NE and the estimated retard correction amount DIGRTD, to calculate an ignition timing retard correction coefficient KTRTD. In FIG. 13C, the curves L81-L83 respectively correspond to predetermined engine rotational speeds NE81, NE82, and NE83 (NE81<NE82<NE83). The ignition timing retard correction coefficient KTRTD is a coefficient for correcting the torque reduction caused by setting the ignition timing IGLOG to a value retarded from the optimal ignition timing IGMBT. The KTRTD map is set so that the ignition timing retard correction coefficient KTRTD decreases as the estimated retard correction amount DIGRTD increases, and the ignition timing retard correction coefficient KTRTD increases as the engine rotational speed NE increases. The ignition timing retard correction coefficient KTRTD takes a value between "0" and "1".

In step S35, the driver demand intake air flow rate GADRV, the EGR correction conversion coefficient KTEGR, and the ignition timing retard correction coefficient KTRTD are applied to the following equation (15) to calculate the driver demand torque TRQDRV.

$$TRQDRV = GADRV \times KTEGR \times KTRTD \quad (15)$$

According to the process of FIG. 12 (including the processes of FIGS. 14 and 15), the theoretical wide-open intake air amount GAWOT, which is an intake air amount corresponding to the state where the throttle valve is fully opened, according to the intake valve operating phase CAIN and the engine rotational speed NE; the theoretical intake air amount GATH corresponding to the state where no exhaust gas recirculation is performed, is calculated according to the theoretical wide-open intake air amount GAWOT and the estimated intake pressure HPBA; and the total EGR ratio REGRT is calculated using the theoretical intake air amount GATH and the drive demand intake air flow rate GADRV. Further, the driver demand intake air flow rate GADRV is converted to the driver demand torque TRQDRV using the total EGR ratio REGRT. Accordingly, it is not necessary to previously set many maps corresponding to various engine operating conditions for converting the driver demand intake air flow rate GADRV to the driver demand torque TRQDRV, which makes it possible to accurately calculate the driver demand torque TRQDRV taking the total EGR ratio REGRT into account with a comparatively simple method.

FIG. 16 is a flow chart of the calculation process in the torque-intake air flow rate conversion block 54 shown in FIG. 3. This process is executed at predetermined time intervals (for example, 10 milliseconds) by the CPU in the ECU 5.

In step S51, a lower target intake air flow rate GACMDLO is set to "0" and an upper target intake air flow rate GACMDHI is calculated by the following equation (21). GAIRMAX in the equation (21) is the maximum value of the intake air flow rate, and $\Delta$ GAIR is a small additional value.

$$GACMDHI=GAIRMAX+\Delta GAIR \tag{21}$$

In step S52, an index parameter i is set to "1". In step S53, a medium target intake air flow rate GACMDMID is calculated by the following equation (22) as an average value of the lower target intake air flow rate GACMDLO and the upper target intake air flow rate GACMDHI.

$$GACMDMID=(GACMDLO+GACMDHI)/2 \tag{22}$$

In step S54, a temporary estimated intake pressure HPBATMP is calculated according to the engine rotational speed NE and the medium target intake air flow rate GACMDMID using the HPBA map (FIG. 13A). In step S55, a DIGRTDTMP calculation process shown in FIG. 17 is executed to calculate a temporary estimated retard correction amount DIGRTDTMP of the ignition timing is calculated.

Figure 17:
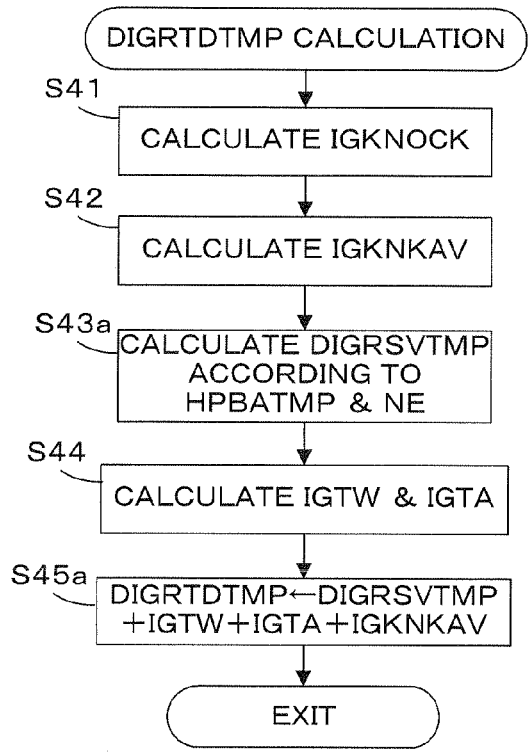
FIG. 17 is a flow chart of the ignition timing retard correction amount calculation process executed in the process of FIG. 16.

The process of FIG. 17 is obtained by replacing steps S43 and S45 of the DIGRTD calculation process shown in FIG. 15, respectively with steps S43a and S45a.

In step S43a, a temporary estimated basic retard correction amount DIGRSVTMP is calculated according to the temporary estimated intake pressure HPBATMP and the engine rotational speed NE, similarly in step S43 of FIG. 15.

In step S45a, the temporary estimated basic retard correction amount DIGRSVTMP is applied to the following equation (14a) to calculate a temporary estimated retard correction amount DIGRTDTMP.

$$DIGRTDTMP=DIGRSVTMP+IGTW+IGTA+IG\text{-}KNKAV \tag{14a}$$

Returning to FIG. 16, in step S56, the temporary ignition timing retard correction coefficient KTRTDTMP is calculated according to the engine rotational speed NE and the temporary estimated retard correction amount DIGRTDTMP using the KTRTD map shown in FIG. 13C.

Figure 18:
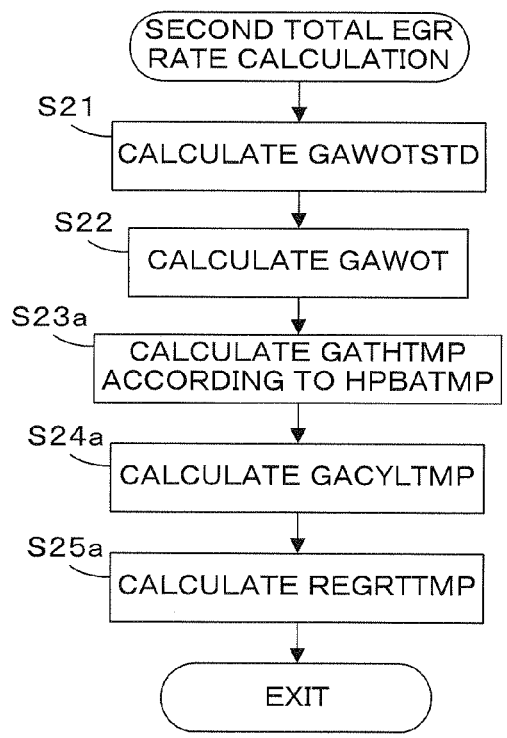
FIG. 18 is a flow chart of the exhaust gas recirculation ratio calculation process executed in the process of FIG. 16.

In step S57, a second total EGR ratio calculation process shown in FIG. 18 is executed. The process of FIG. 18 is obtained by replacing steps S23-S25 of the first total EGR ratio calculation process shown in FIG. 14, respectively with steps S23a-S25a.

In step S23a, the temporary estimated intake pressure HPBATMP is applied to the following equation (11a) to calculate a temporary theoretical intake air amount GATHTMP.

$$GATHTMP=GAWOT\times HPBATMP/PBASTD \tag{11a}$$

In step S24a, the medium target intake air flow rate GACMDMID [g/sec] is applied to the following equation (12a) to calculate a temporary intake air amount GACYLTMP in one intake stroke of one cylinder.

$$GACYLTMP=GACMDMID\times KC/NE \tag{12a}$$

In step S25a, a temporary total EGR ratio REGRTTMP is calculated by the following equation (2a).

$$REGRTTMP=(GATHTMP-GACYLTMP)/GATHTMP \tag{2a}$$

Returning to FIG. 16, in step S58, a temporary EGR correction conversion coefficient KTEGRTMP is calculated according to the temporary total EGR ratio REGRTTMP and the engine rotational speed NE using the KTEGR map shown in FIG. 13B.

In step S59, the medium target intake air flow rate GACMDMID, the temporary EGR correction conversion coefficient KTEGRTMP, and the temporary ignition timing retard correction coefficient KTRTDTMP are applied to the following equation (15a) to calculate a temporary estimated output torque TRQTMP.

$$TRQTMP=GACMDMID\times KTEGRTMP\times KTRTDTMP \tag{15a}$$

In step S60, it is determined whether or not the temporary estimated output torque TRQTMP is equal to the target torque TRQCMD. Normally, the answer to step S60 is negative (NO) at first. Accordingly, the process proceeds to step S61, in which it is determined whether or not the index parameter i is equal to the maximum value IMAX (for example, 15). The maximum value IMAX is a parameter depending on a bit number of the value indicating the temporary estimated output torque TRQTMP. If the target torque TRQCMD is expressed with a value of "15" bits, the maximum value IMAX is set to "15".

Since the answer to step S61 is negative (NO) at first, the process proceeds to step S62, in which it is determined whether or not the temporary estimated output torque TRQTMP is greater than the target torque TRQCMD. If the answer to step S62 is affirmative (YES), the upper target intake air flow rate GACMDHI is set to the medium target intake air flow rate GACMDMID (step S63). On the other hand, if TRQTMP is equal to or less than TRQCMD, the lower target intake air flow rate GACMDLO is set to the medium target intake air flow rate GACMDMID (step S64). Subsequently, the index parameter i is incremented by "1" (step S65), and the process returns to step S53.

Figure 19:
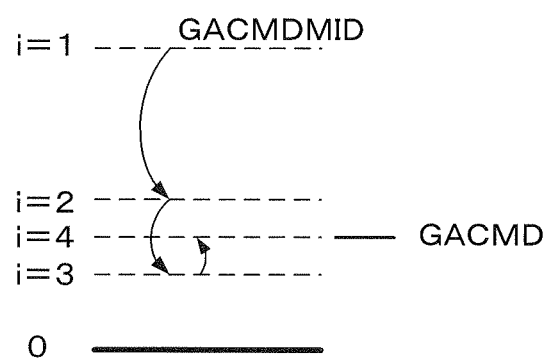
FIG. 19 is a graph for illustrating a convergence calculation of a target intake air flow rate (GACMD).

By repeating the calculation of steps S53-S65, the temporary estimated output torque TRQTMP is converged to the target torque TRQCMD, as shown in FIG. 19. FIG. 19 shows an example in which the temporary estimated output torque TRQTMP is converged to the target torque TRQCMD with four times of calculations.

If the answer to step S60 is affirmative (YES), i.e., the temporary estimated output torque TRQTMP has converged to the target torque TRQCMD, or if the index parameter i reaches the maximum value IMAX, the process proceeds to step S66, in which the target intake air flow rate GACMD is calculated by the following equation (23). The equation (23) performs a limit process calculation so that the target intake air flow rate GACMD does not exceed the maximum intake air flow rate GAIRMAX, to calculate the target intake air flow rate GACMD.

$$GACMD=\min(GACMDMID,GAIRMAX) \tag{23}$$

According to the process of FIG. 16, the target intake air flow rate GACMD is calculated by the convergence calculation taking the total EGR ratio REGRT and the retard correction amount DIGRTD of the ignition timing into account. Specifically, the temporary EGR correction conversion coefficient KTEGRTMP and the temporary estimated retard correction amount DIGRTDTMP are calculated using the medium target intake air flow rate GACMDMID which is a temporary target intake air flow rate; the temporary estimated output torque TRQTMP is calculated taking the output torque reduction due to the exhaust gas recirculation and the retard correction of the ignition timing into account; the medium target intake air flow rate GACMDMID is updated in the direction for making the temporary estimated output torque TRQTMP converge to the target torque TRQCMD; and the target intake air flow rate GACMD is set to the medium target intake air flow rate GACMDMID at the time the temporary estimated output torque TRQTMP has converged to the target torque TRQCMD. According to this calculation method, the setting of the target intake air flow rate GACMD is accurately performed taking the exhaust gas recirculation and the retard correction amount of the ignition timing into account, thereby improving the response performance of the control for making the engine output torque coincide with the target output torque TRQCMD.

Further, also in the torque-intake air flow rate conversion block 54, the temporary total EGR ratio REGRTTMP is calculated by the similar method as in the intake air flow rate-torque conversion block 52. Therefore, it is not necessary to previously set many maps corresponding to various engine operating conditions when converting the target output torque TRQCMD to the target intake air flow rate GACMD, which makes it possible to accurately calculate the target intake air flow rate GACMD taking the total EGR ratio RFGRT into account with a comparatively simple method.

In the process of FIG. 16, the time the temporary estimated output torque TRQTMP has reached the target torque TRQCMD is regarded as the convergence time. Alternatively, the time a difference DTRQ between the temporary estimated output torque TRQTMP and the target torque TRQCMD has become equal to or less than a predetermined threshold value DTRQTH may be regarded as the convergence time, and the target intake air flow rate GACMD may be set to the medium target intake air flow GACMDMID at the convergence time.

In this embodiment, the crank angle position sensor 11 corresponds to the rotational speed detecting means, the intake pressure sensor 8 corresponds to the intake pressure detecting means, and the ECU 5 constitutes the target intake air amount calculating means, the intake pressure estimating means, the wide-open intake air amount calculating means, the theoretical intake air amount calculating means, the exhaust gas recirculation ratio calculating means, the target output torque calculating means, and the control means. Specifically, the process of FIG. 10 corresponds to the target intake air amount calculating means in claim 1, step S32 of FIG. 12 and step S54 of FIG. 16 respectively correspond to the intake pressure estimated means in claims 1 and 3, step S22 of FIGS. 14 and 18 respectively corresponds to the wide-open intake air amount calculating means in claims 1 and 3, step S23 of FIG. 14 and step S23a of FIG. 18 respectively correspond to the theoretical intake air amount calculating means in claims 1 and 3, steps S24 and S25 of FIG. 14 correspond to the exhaust gas recirculation ratio calculating means in claim 1, steps S24a and 25a of FIG. 18 correspond to the exhaust gas recirculation ratio calculating means in claim 3, steps S31 and S35 of FIG. 12 correspond to the target output torque calculating means in claim 1, the target torque calculation block 53 of FIG. 3 corresponds to the target output torque calculating means in claim 3, and the process of FIG. 16 corresponds to the target intake air amount calculating means in claim 3.

The present invention is not limited to the embodiment described above, and the modifications described below may be made.

Modification 1

In the calculation in the intake air flow rate-torque conversion block 52 described above, an estimated output torque HTRQ of the engine 1 can be calculated by replacing the estimated intake pressure HPBA and the driver demand target intake air flow rate GADRV respectively with the detected intake pressure PBA and the detected intake air flow rate GAIR.

The calculated estimated output torque HTRQ is applicable to the traction control or the stabilization control of the vehicle driven by the engine 1.

According to this modification, it is not necessary to previously set many maps corresponding to various engine operating conditions, which makes it possible to accurately calculate the estimated engine output torque taking the exhaust gas recirculation ratio into account with a comparatively simple method. This modification corresponds to the invention recited in claim 2.

Further, the total EGR ratio REGRT may be calculated using an estimated intake air flow rate HGAIR instead of the detected intake air flow rate GAIR. The estimated intake air flow rate HGAIR can be calculated according to the throttle valve opening TH, the atmospheric pressure PA, and the intake pressure PBA. Therefore in this modification, the intake air flow rate sensor 13 or the calculation process of the estimated intake air flow rate HGAIR corresponds to the intake air amount obtaining means.

Modification 2

In the calculation of the torque-intake air flow rate conversion block 54, the temporary estimated intake pressure HPBATMP and the target torque TRQCMD may be replaced respectively with the detected intake pressure PBA and the detected output torque TRQDET. According to such modification, the estimated intake air flow rate (an estimate value of the actual intake air flow rate) HGAIR of the engine 1 can be calculated by performing the conversion calculation and setting the estimated intake air flow rate HGAIR to the temporary target intake air flow rate GACMDMID at the convergence time. The output torque of the engine 1 can be detected by a known torque sensor (shown in Japanese patent laid-open No. H05-26019 (Kokoku), for example).

By using the calculated estimated intake air flow rate HGAIR, the intake air flow rate sensor can be made unnecessary. When using the intake air flow rate sensor, the estimated intake air flow rate HGAIR can be applied to a failure determination of the intake air flow rate sensor, or a determination of aging deterioration in detection accuracy of the intake air flow rate sensor.

According to this modification, it is not necessary to previously set many maps corresponding to various engine operating conditions, which makes it possible to accurately calculate the estimated intake air flow rate HGAIR taking the exhaust gas recirculation ratio into account with a comparatively simple method. This modification corresponds to the invention recited in claim 5.

Other Modifications

Further, in the above-described embodiment, the present invention is applied to controlling the internal combustion engine in which the external exhaust gas recirculation through the exhaust gas recirculation passage 22 is performed. The present invention may be applicable also to controlling the internal combustion engine in which the external exhaust gas recirculation is not performed (only the internal exhaust gas recirculation is performed).

The present invention can also be applied to controlling a watercraft propulsion engine such as an outboard engine having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A control system for an internal combustion engine having a throttle valve disposed in an intake passage of said engine, comprising:
    rotational speed detecting means for detecting a rotational speed of said engine;
    target intake air amount calculating means for calculating a target intake air amount of said engine;
    intake pressure estimating means for estimating an intake pressure of said engine;
    wide-open intake air amount calculating means for calculating a wide-open intake air amount according to the engine rotational speed, the wide-open intake air amount being an intake air amount corresponding to a state where said throttle valve is fully opened;
    theoretical intake air amount calculating means for calculating a theoretical intake air amount according to the wide-open intake air amount and the intake pressure, the theoretical intake air amount being an intake air amount corresponding to a state where no exhaust gas of said engine is recirculated to a combustion chamber of said engine;
    exhaust gas recirculation ratio calculating means for calculating an exhaust gas recirculation ratio using the theoretical intake air amount and the target intake air amount;
    target output torque calculating means for calculating a target output torque of said engine using the target intake air amount and the exhaust gas recirculation ratio; and
    control means for controlling said engine using the target output torque.

2. A control system according to claim 1, wherein said engine is provided with a valve operating phase characteristic varying mechanism which varies an operating phase of at least one intake valve of said engine,
    wherein said wide-open intake air amount calculating means calculates the wide-open intake air amount according to the operating phase of said at least one intake valve.

3. A control method for an internal combustion engine having a throttle valve disposed in an intake passage of said engine, said control method comprising the steps of:
    a) detecting a rotational speed of said engine;
    b) calculating a target intake air amount of said engine;
    c) estimating an intake pressure of said engine;
    d) calculating a wide-open intake air amount according to the engine rotational speed, the wide-open intake air amount being an intake air amount corresponding to a state where said throttle valve is fully opened;
    e) calculating a theoretical intake air amount according to the wide-open intake air amount and the intake pressure, the theoretical intake air amount being an intake air amount corresponding to a state where no exhaust gas of said engine is recirculated to a combustion chamber of said engine;
    f) calculating an exhaust gas recirculation ratio using the theoretical intake air amount and the target intake air amount;
    g) calculating a target output torque of said engine using the target intake air amount and the exhaust gas recirculation ratio; and
    h) controlling said engine using the target output torque.

4. A control method according to claim 3, wherein said engine is provided with a valve operating phase characteristic varying mechanism which varies an operating phase of at least one intake valve of said engine,
    wherein the wide-open intake air amount is calculated according to the operating phase of said at least one intake valve.

* * * * *